No. 676,763. Patented June 18, 1901.
C. O. NELSON.
COFFEE BOILER.
(Application filed Mar. 26, 1901.)

(No Model.)

Witnesses
G. S. Belt,
Edgar M. Kitchin

Inventor
Charles O Nelson
By Messrs Fenwick & Lawrence
and James T Watson, Attorneys

UNITED STATES PATENT OFFICE.

CHARLES O. NELSON, OF DULUTH, MINNESOTA.

COFFEE-BOILER.

SPECIFICATION forming part of Letters Patent No. 676,763, dated June 18, 1901.

Application filed March 26, 1901. Serial No. 52,954. (No model.)

*To all whom it may concern:*

Be it known that I, CHARLES O. NELSON, a citizen of the United States, residing at Duluth, in the county of St. Louis and State of Minnesota, have invented certain new and useful Improvements in Coffee-Boilers; and I do hereby declare the following to be a full, clear, and exact description of the invention, such as will enable others skilled in the art to which it appertains to make and use the same.

My invention relates to improvements in coffee-pots; and it consists in providing means for gaging the quantity of coffee necessary to a given quantity of water, and also means for gaging the quantity of water within the pot.

It also consists of certain other novel constructions, combinations, and arrangements of parts, as will be hereinafter more fully described and claimed.

Figure 1:
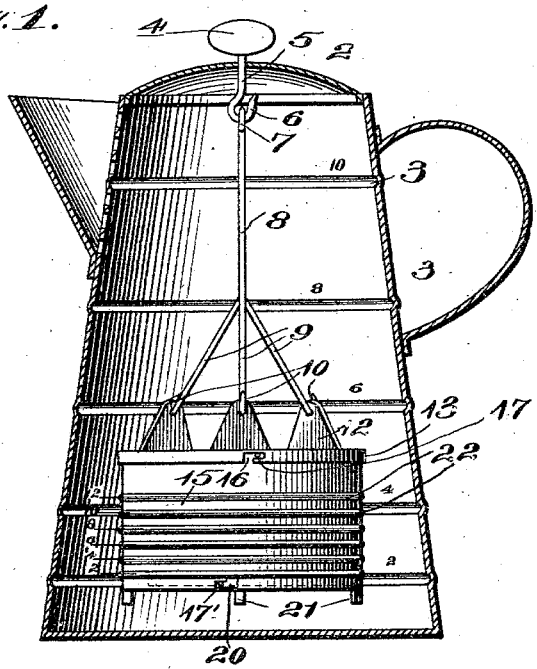
Figure 2:
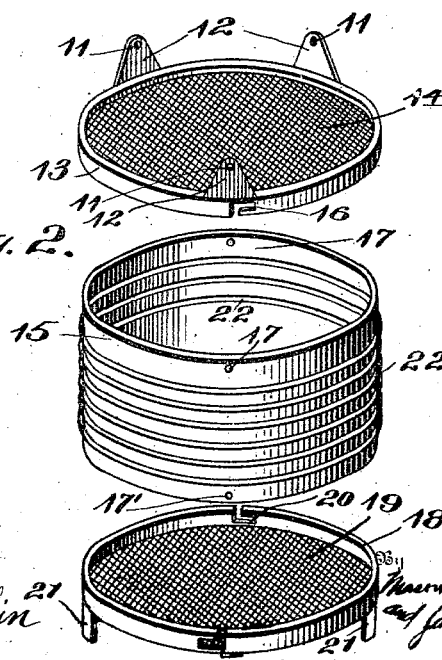

In the accompanying drawings, Figure 1 represents a vertical section longitudinally of a coffee-pot embodying the features of my invention; and Fig. 2 represents a perspective of the ground-coffee cylinder, the top and bottom being removed and illustrated separately.

My invention contemplates the use of any preferred form of pot or receptacle, as 1, provided with any suitable cover, as 2. Parallel-spaced peripheral ribs, as 3 3, are formed about receptacle 1 in any suitable number and are arranged at distances apart indicating sufficient space within the receptacle for a predetermined quantity of water. The ribs 3 illustrated in the accompanying drawings, Fig. 1, are representative of graduations equivalent to two cups of beverage, and the numbers "2," "4," "6," "8," and "10" represented on said figure indicate the distance from the bottom to the level of the stated number of cups of water within receptacle 1.

A knob, as 4, is provided above cover 2 and provided with a downwardly-projecting rod, as 5, which passes through cover 2 and is formed into a hook 6. A hook, as 7, is adapted to engage hook 6 and support rod 8, with which it is formed integral. Rod 8 is adapted to extend downwardly a suitable distance and then support a plurality of downwardly-extending rods, as 9 9. Rods 9 9 may be formed integral with or formed separate from and secured to rod 8, as desired. The lower ends of rods 9 are preferably bent into hooks, as 10 10, which hooks 10 are adapted to engage eyes, as 11 11, in ears 12 12, formed upon and extending upwardly from annular ring 13 13. Ring 13 is adapted to be provided with a cloth mesh, as 14, which forms a cover for cylinder 15, said ring 13 being adapted to be secured to said cylinder by means of bayonet-shaped slots, as 16, of any suitable number, formed in the said ring, which slots are adapted to engage lugs, as 17 17, formed upon the periphery of the cylinder 15 and preferably struck out from the material thereof, whereby said cloth will be pressed down upon the edge of said cylinder and firmly held in place by means of said ring 13. A similar ring, as 18, is provided for the bottom of cylinder 15, and the bottom of said cylinder is provided with a cloth or wire-mesh covering, as 19, and the said ring 18 being formed with bayonet-shaped slots, as 20 20, adapted to register with lugs 17' at the lower end of said cylinder 15. It will be seen that the cloth covering for the top and bottom of said cylinder is adapted to be placed in position and the rings 13 and 18 forced against the same and secured to the cylinder, whereby said cloth is held somewhat after the manner of securing a drumhead, thereby making said cloth of ready removal and replacement. Any suitable form and number of legs, as 21 21, may be provided upon the lower ring 18 for preventing the covering 19 from contacting with the bottom of receptacle 1.

The cylinder 15 is adapted to form the ground-coffee receptacle, and the cloth or mesh covered ends 14 and 19 permit the free access of water, but prevent the escape of coffee-grounds. Said coffee-receptacle 15 is provided with a series of spaced parallel annular ribs or other preferred marks of graduation, as 22 22, which are adapted to indicate the requisite amount of ground coffee to a relative amount of water. These graduations are adapted to be marked, as shown in Fig. 1 of the accompanying drawings, with the numbers "2," "4," "6," "8," "10," and "12," which indicate the number of cups of coffee to be made from the given quantity of grounds. Any suitable numbers of graduation may of course be used, and the principle would be the same if applied to teas or other beverage requiring a given amount of material to a relative amount of water.

Among the many advantages of my structure might be mentioned the obviating of the necessity for measuring the coffee and water used and the provision of means for producing a beverage free from grounds. A great advantage may also be seen in the use of the covers 14 and 19, secured by annular rings, which rings are adapted to be applied to the coffee-receptacle by means of bayonet-slots registering with lugs, whereby said covers may be readily and easily removed, renewed, or replaced, and whereby I am able to produce a coffee-receptacle which may be readily kept perfectly clean, is comparatively indestructible, and is incapable of corrosion.

Having thus described my invention, what I claim as new, and desire to secure by Letters Patent, is—

1. A coffee-pot, comprising in its construction a receptacle provided with annular marks of graduation for indicating a comparative containing capacity, and means for indicating the relative amount of coffee necessary for a comparative amount of water, substantially as described.

2. A coffee-pot, comprising in its construction a receptacle provided with annular marks of graduation formed in the body portion thereof and adapted to indicate the comparative containing capacity, whereby the contents of said pot may be accurately ascertained, and means for indicating the relative amount of solid material necessary for a comparative amount of water, comprising a receptacle within said pot provided with graduations, substantially as described.

3. The combination with a containing-receptacle provided with marks of graduation indicating the containing capacity thereof, of means within said receptacle for indicating the comparative amount of solid necessary for a relative quantity of beverage, comprising a smaller receptacle within said outer containing-receptacle, said smaller receptacle being provided with marks of graduation indicating given amounts of coffee, or other solid necessary to a relative quantity of liquid, means for indicating the comparative relation of the graduations upon the containing and the smaller receptacles, and means for suspending said smaller receptacle within said containing-receptacle, substantially as described.

4. In a coffee or tea pot, the combination with a containing-receptacle provided with annular graduated indications of relative quantities contained, of means for indicating a comparative amount of coffee or tea and means for exposing said coffee or tea to the free access of the contained liquid without permitting said solids being removed from the containing-receptacle with said liquid, comprising a smaller receptacle with said containing-receptacle, said smaller receptacle being suspended within said containing-receptacle, and provided with removable perforated ends, and annular graduated indications of the comparative amount of tea or coffee contained, relative to the amount of liquid within said containing-receptacle, formed in the sides thereof, substantially as described.

5. In a coffee-pot, the combination with a containing-receptacle provided with annular graduated indications of relative containing capacity, of means for indicating the relative amount of coffee and for retaining the same in contact with the contained liquid but preventing its escape therewith, comprising a cylindrical receptacle within said containing-receptacle, a rod pivotally supporting said cylindrical receptacle free from contact with the walls of said containing-receptacle, ears upon said cylinder and adapted to receive said rod and be supported thereby, an annular ring to which said ears are secured, formed with bayonet-shaped slots, a gauze covering secured beneath said ring, whereby the same is adapted to form the cover for said cylinder, a cylindrical body portion formed with lugs on its periphery for registering with said bayonet-shaped slots and retaining said ring in position on said cylinder, another annular ring formed with similar slots, supporting a similar gauze and adapted to be secured by similar lugs on the bottom of said cylinder, legs secured to the bottom ring and adapted to prevent contact of said bottom gauze with the bottom of said containing-receptacle, and annular rings of graduation for indicating the comparative amount of coffee relative to the quantity of liquid in said containing-receptacle, substantially as described.

6. A coffee-pot, comprising in its construction a receptacle provided with marks of graduation for indicating a comparative containing capacity, and means for indicating the relative amount of coffee necessary for a comparative amount of water, substantially as described.

In testimony whereof I hereunto affix my signature in presence of two witnesses.

CHARLES O. NELSON.

Witnesses:
JAMES T. WATSON,
C. P. MAGINNIS.